April 13, 1948.  A. M. SORRENTINO  2,439,758
ANTISKID JACKING DEVICE FOR VEHICLES
Filed Jan. 21, 1947
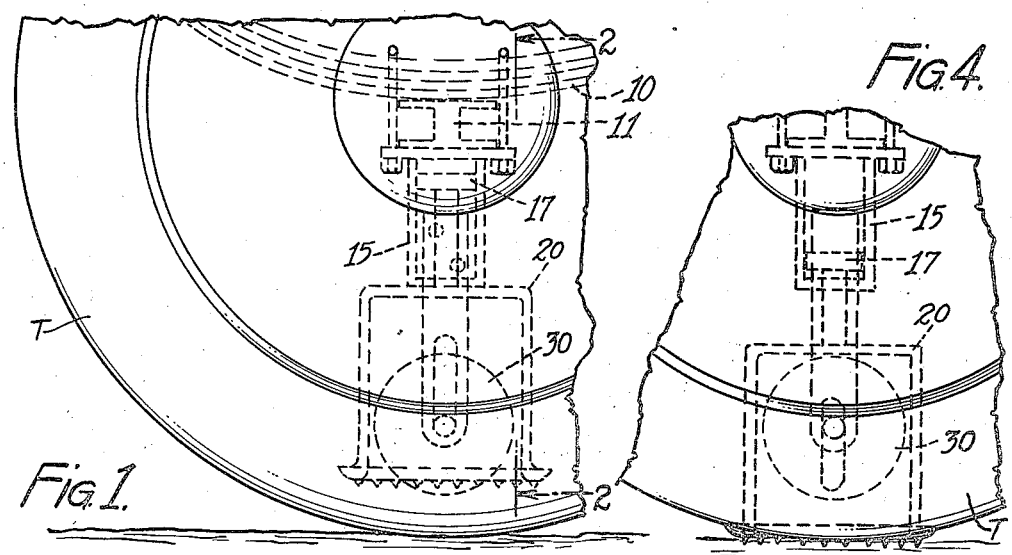
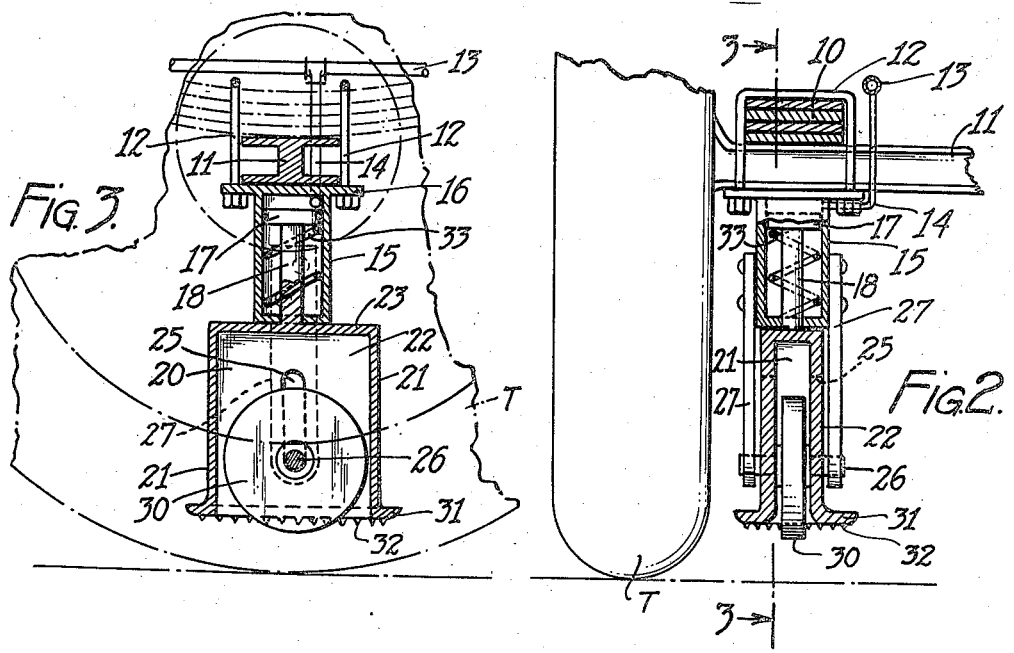
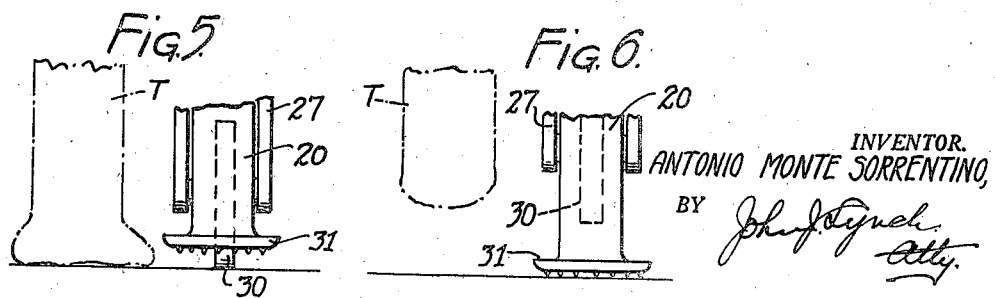
INVENTOR.
ANTONIO MONTE SORRENTINO,
BY Patented Apr. 13, 1948

2,439,758

UNITED STATES PATENT OFFICE 2,439,758

ANTISKID JACKING DEVICE FOR VEHICLES

Antonio Monte Sorrentino, Brooklyn, N. Y.

Application January 21, 1947, Serial No. 723,399

6 Claims. (Cl. 280—150)

This invention relates to a combination automatic vehicle jacking device that serves as an emergency supporting wheel means in the event of a blow-out and as a car raising anti-skid foot for use in slippery road conditions to prevent skidding of the vehicle.

A particular object of the invention is to provide a device of the character referred to, at a point adjacent to and inside each of the wheels of an automotive vehicle so that in the event of a tire blow-out, an auxiliary wheel will engage the ground or road and permit the car to be moved under its own power to a place where the tire can be changed.

A still further object of the invention is to provide an anti-skid foot in association with the wheel of the device so that the wheel that has the blow-out may be raised off the ground sufficiently to permit replacement of the tire that has been punctured.

A still further and equally important object of the invention is to provide an anti-skid foot device that may be lowered when the road conditions would cause skidding of the vehicle, which foot having a roughened under surface, will prevent sidewise skidding of the vehicle, the foot device to be lowered by control from the dash of the vehicle through a hydraulic system to prevent skidding or to raise the wheel in tire changing operations.

Still further objects of the invention are to provide for the inclusion in a single device that can be mounted on the vehicle by anyone, the means of carrying out all of the foregoing objects at small cost and minimum effort.

With these and other objects in view, the invention comprises certain constructions hereinafter described and then particularly pointed out in the claims and a preferred embodiment of my invention is illustrated in the accompanying drawing, in which:

Figure 1 is a view in side elevation of the wheel of an automotive vehicle, shown in part, and illustrating in dotted lines the position of the device with respect to the wheel, Figure 2 is a section on the line 2—2 of Figure 1 showing the structure of the device, Figure 3 is a section on the line 3—3 of Figure 2 showing the relative mounting of the wheel and foot parts of the invention, Figure 4 is a fragmentary view similar to Figure 1 showing the operation of the foot member as an anti-skid device, Figure 5 is a diagrammatic view in front elevation showing the operation of the wheel in the event of a tire blow-out, and Figure 6 is a view similar to Figure 5 showing the operation of the foot member as a wheel lifting jack to facilitate the changing of the blown tire.

Referring to the drawing in detail 10 indicates a motor vehicle spring which is secured to an axle 11 by the usual shackle bolt 12. In view of the fact that the operation and mounting of jacks at each wheel of a vehicle for selective hydraulic operation from the dash of the car is well known in the art, it is believed sufficient to refer only in this application to a pipe 13 which is common to all the wheels and through which fluid or air may be forced by a suitable pump so that each device may be supplied as through a pipe 14 which connects the pipe 13 with a cylinder 15. The cylinder 15 is fixed against the under side of the axle 11 or other supporting member by bolts 12 and includes an abutting plate 16 from which extends downwardly the hollow cylinder 15, into the upper end of which the pipe 14 opens.

Four cylinders and their associated parts are employed, one adjacent each wheel, each cylinder having a piston 17 and piston rod 18, the latter of which depends from the lower end of the cylinder 15 and carries a foot 20 which constitutes a wheel housing as will be later described. The foot is in the nature of a rectangular receptacle having end walls 21, side walls 22 and a closed top wall 23 to which the piston rod 18 is joined in any manner. The side walls 22 are slotted as at 25 to provide for the passage of an axle 26 journalled in the lower ends of arm 27 which are secured to the opposite sides of the cylinder 15 in any suitable manner and extend downwardly alongside the side walls 22 of the foot 20.

The foot receptacle 20 houses a wheel 30 mounted on the axle 26, the wheel extending below the foot 20 when the latter is in raised position and being disposed about two inches off the ground, or a distance sufficient to prevent the blow-out of the adjacent tire from letting the wheel down on its tire holding rim, as illustrated in Figure 5, where the tire is indicated as at T.

The bottom of the foot 20 is flanged annularly as at 31 and the under side of the flanged portion is provided with gripping projections or spines 32 which furnish an anti-skid function to the foot so that in the event of bad or slippery road conditions the foot is lowered to engage the ground and prevent sidewise skidding of the vehicle, as illustrated in Figure 4. Beneath the piston in each cylinder a spring 33 is in operation when pressure is released in the cylinder to raise the foot to the position shown in Figure 3.

In the operation of the device in carrying out its various uses, the foot is lowered as shown in Figure 4 when pressure is introduced into the cylinder 15 to provide an anti-skid device. If a blowout has occurred, as shown in Figure 5, the wheel 30 engages the ground and supports that corner of the vehicle where the blow-out occurred until such time as the defect may be corrected. When the tire is to be changed, the lowering of the foot under pressure to its full extent will raise the wheel off the ground enough to permit the tire to be changed, it being evident that the side wall slots 25 permit relative movement of the foot with respect to said wheel, housed therein.

It is evident therefore that I have provided a combination anti-skid, auto jack and emergency wheel unit which can be placed in position by anyone, can be made at a minimum cost and which will eliminate the necessity of putting skid chains on wheels, carrying jacks and using them manually to raise the wheels in changing tires or wheels and providing a safety device operable without attention on the part of the driver in the event of a blow-out which prevents accidents and ruin of the tire due to blow-outs.

The axle 26 extending through the slots 25 in the side walls 22 of the foot acts as a guide to prevent any rotating movement of the foot as the latter is raised or lowered, the axle keeping the foot firmly in position when the latter is used as an anti-skid device or in car jacking operation.

While I have described what I consider to be a highly desirable embodiment of my invention, it is obvious that many changes in form could be made without departing from the spirit of my invention, and I therefore do not limit myself to the exact form shown herein and described, nor to anything less than the whole of my invention as hereinbefore set forth, and as hereinafter claimed.

What I claim as new and desire to secure by Letters Patent is:

1. In a vehicle, a ground engaging support member mounted on the vehicle adjacent the inner side of each wheel and comprising a vertically disposed cylinder, a piston in the cylinder, a piston rod depending from the piston and extending out of said cylinder, a foot on the lower end of said rod arranged to be lowered to ground engaging position when fluid pressure is applied to said piston, means for yieldably maintaining the piston in raised position whereby the foot is spaced from the ground when the fluid pressure on the piston is relieved, and a wheel suspended from said cylinder in spaced relation with the ground and extending below the bottom of said foot when the latter is in raised position for engagement with the ground when the tire of the adjacent wheel is deflated.

2. In a vehicle, a ground engaging support member mounted on the vehicle adjacent the inner side of each wheel and comprising a vertically disposed cylinder, a piston in the cylinder, a piston rod depending from the piston and extending out of said cylinder, a foot on the lower end of said rod arranged to be lowered to ground engaging position when fluid pressure is applied to said piston, means for yieldably maintaining the piston in raised position whereby the foot is spaced from the ground when the fluid pressure on the piston is relieved, a wheel suspended from said cylinder in spaced relation with the ground and extending below the bottom of said foot, when the latter is in raised position, for engagement with the ground when the tire of the adjacent wheel is deflated, and said foot being operable to engage the ground to lift said suspended wheel and the vehicle wheel off the ground.

3. In a vehicle, a ground engaging support member mounted on the vehicle adjacent the inner side of each vehicle wheel and comprising a vertically disposed cylinder, a piston in the cylinder, a piston rod depending from the piston and extending out of said cylinder, a slotted hollow foot on the lower end of said rod arranged to be lowered to ground engaging position when fluid is applied under pressure to said piston, means for yieldably maintaining said piston in raised position whereby the foot is lifted from the ground when the fluid pressure on the piston is relieved, arms fixed on the cylinder, an axle carried in said arms and extending through the slots of said foot, a wheel on the axle encased within the foot and projecting therebelow, and arranged for ground engagement when the tire of the adjacent vehicle wheel is deflated, and said foot being movable beyond the lower edge of the encased wheel for engagement with the ground and the lower surface of the foot being provided with an anti-skid surface.

4. In a vehicle, a ground engaging support member mounted on the vehicle adjacent the inner side of each wheel and comprising a vertically disposed cylinder, a piston in the cylinder, a piston rod depending from the piston and extending out of the cylinder, a hollow foot mounted on the lower end of the piston and presenting side, end and top walls, the side walls being vertically slotted, arms depending from the cylinder, a wheel in the foot, an axle on which the wheel is mounted, the axle being journalled in the arms and passing through said side wall slots to provide a guide for the foot, said wheel extending below the bottom of the foot when the latter is in raised position and having its lower peripheral edge disposed in a plane intermediate the peripheries of the wheel rim and a tire.

5. In a vehicle, a ground engaging member mounted on the vehicle adjacent the inner side of each wheel and comprising a hollow slotted foot, an axle passing laterally through said foot, a cylinder, means for suspending the axle in fixed relation to said cylinder, a piston and rod combination in the cylinder for movably supporting said foot, whereby the latter can be moved relatively to said axle, a wheel on the axle housed within said foot and extending therebelow, the bottom annular edge of said foot being flanged to provide a bearing surface and the under side of said bearing surface being spined to provide an anti-skid area.

6. In a vehicle, a ground engaging member mounted on the vehicle adjacent the inner side of each vehicle wheel and comprising a hollow foot, a cylinder, a piston and piston rod unit to which said foot is secured for raising and lowering movement, an axle passing through the side walls of said foot, a wheel on the axle, arms fixed to the cylinder and in the lower ends of which said axle is journalled, the side walls of the foot being slotted to allow relative movement of the foot and axle supported wheel, when the foot is lowered by pressure on the piston, and means for raising the piston when the pressure thereon is relieved.

ANTONIO MONTE SORRENTINO.

REFERENCES CITED

The following references are of record in the file of this patent:

UNITED STATES PATENTS

| Number | Name | Date |
| --- | --- | --- |
| 1,559,877 | Huggins | Nov. 3, 1925 |
| 1,607,411 | Olm | Nov. 16, 1926 |
| 2,006,210 | Bruffee | June 25, 1935 |
| 2,049,357 | Daignault | July 28, 1936 |